(12) United States Patent
Lin et al.

(10) Patent No.: US 8,111,017 B2
(45) Date of Patent: Feb. 7, 2012

(54) CIRCUITS AND METHODS FOR CONTROLLING DIMMING OF A LIGHT SOURCE

(75) Inventors: Yung Lin Lin, Palo Alto, CA (US); Ching-Chuan Kuo, Taipei (TW)

(73) Assignee: O2Micro, Inc, Santa Clara, CA (US)

( * ) Notice: Subject to any disclaimer, the term of this patent is extended or adjusted under 35 U.S.C. 154(b) by 29 days.

(21) Appl. No.: 12/834,672

(22) Filed: Jul. 12, 2010

(65) Prior Publication Data

US 2011/0140620 A1 Jun. 16, 2011

(51) Int. Cl.
*G05F 1/00* (2006.01)

(52) U.S. Cl. ................ 315/307; 315/209 R; 315/224

(58) Field of Classification Search ........... 315/160, 315/171, 172, 185 R, 186, 193, 200 R, 201, 315/209 R, 210, 224, 291, 294, 295, 297, 315/299, 307, 308, 310, 312, 313, 320, 361, 315/362, DIG. 4, 7
See application file for complete search history.

(56) References Cited

U.S. PATENT DOCUMENTS

| | | | |
|---|---|---|---|
| 5,691,605 A | 11/1997 | Xia et al. | |
| 6,839,247 B1 | 1/2005 | Yang et al. | |
| 7,190,124 B2 | 3/2007 | Kumar et al. | |
| 7,312,783 B2 | 12/2007 | Oyama | |
| 7,759,881 B1 * | 7/2010 | Melanson | 315/307 |
| 7,800,315 B2 | 9/2010 | Shteynberg et al. | |
| 7,804,256 B2 | 9/2010 | Melanson | |
| 7,852,017 B1 * | 12/2010 | Melanson | 315/291 |
| 2004/0085030 A1 | 5/2004 | Laflamme et al. | |
| 2004/0130271 A1* | 7/2004 | Sekoguchi et al. | 315/111.81 |
| 2007/0182347 A1 | 8/2007 | Shteynberg et al. | |
| 2008/0203946 A1 | 8/2008 | Ito et al. | |
| 2008/0258647 A1 | 10/2008 | Scianna | |
| 2009/0167187 A1 | 7/2009 | Kitagawa et al. | |
| 2009/0184662 A1 | 7/2009 | Given et al. | |
| 2009/0251059 A1* | 10/2009 | Veltman | 315/200 R |
| 2009/0295303 A1 | 12/2009 | Pucko et al. | |
| 2009/0322254 A1 | 12/2009 | Lin | |
| 2009/0322255 A1 | 12/2009 | Lin | |

FOREIGN PATENT DOCUMENTS

| | | |
|---|---|---|
| CN | 1760721 A | 4/2006 |
| CN | 101176386 A | 5/2008 |
| CN | 101472368 A | 7/2009 |
| EP | 2026634 A1 | 2/2009 |

* cited by examiner

*Primary Examiner* — Douglas W Owens
*Assistant Examiner* — Jianzi Chen

(57) ABSTRACT

A controller for controlling dimming of a light source includes a detection pin, an input signal pin, and a monitoring pin. The detection pin is operable for monitoring a rectified voltage and for detecting whether the rectified voltage comes from a TRIAC dimmer or an on/off switch dimmer. The input signal pin is operable for receiving an input signal indicative of the rectified voltage and the controller controls dimming of the light source according to the input signal if the rectified voltage comes from a TRIAC dimmer. The monitoring pin is operable for receiving a monitoring signal indicating an operation of the on/off switch dimmer and the controller controls dimming of the light source according to the monitoring signal if the rectified voltage comes from an on/off switch dimmer.

20 Claims, 10 Drawing Sheets

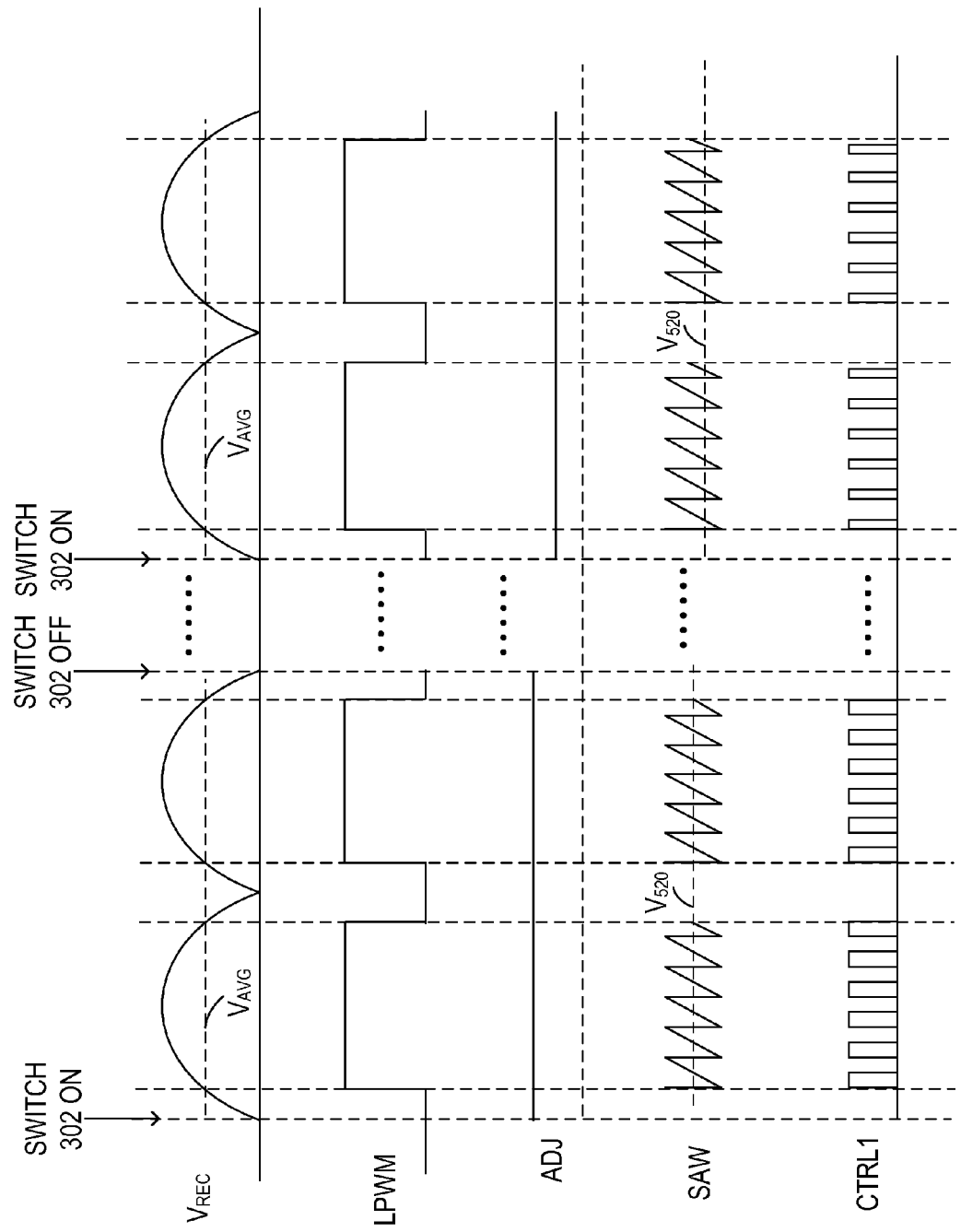

US 8,111,017 B2

CIRCUITS AND METHODS FOR CONTROLLING DIMMING OF A LIGHT SOURCE

BACKGROUND

General lighting utilizing light-emitting diodes (LEDs) has been under development. LEDs offer several advantages over traditional light sources such as fluorescent lamps and incandescent lamps. For example, LEDs have significant lower power consumption. Unlike traditional light sources such as incandescent light bulbs that convert significant electrical current heating up the metal filaments to a temperature high enough to generate light, LEDs generate virtually no heat and utilize a fraction of the energy to produce an equivalent lumen of lighting. For example, in a light bulb application, an LED light source may consume less than 7 Watts to produce the same amount of brightness compared to an incandescent light source consuming approximately 60 Watts. In a T-8 tube application, the brightness produced by an LED light source consuming less than 20 Watts is even greater than the brightness produced by a fluorescent lamp consuming approximately 60 Watts.

The operational life of an LED is extended to 50,000 hours or even 100,000 hours. In contrast, the average life of an incandescent bulb is only approximately 5000 hours and the average life of a fluorescent lamp is approximately 15,000 hours. Moreover, LEDs contain no mercury or any other hazardous materials or chemicals and emit zero ultra violet (UV) radiation unlike incandescent or fluorescent lamps.

Dimming techniques are used to adjust the brightness of the light sources. For example, a power converter receives an AC voltage from an AC power source and generates a DC voltage to power an LED light source. A controller adjusts the output power of the power converter according to a dimmer coupled between the AC power source and the power converter in order to control dimming of the LED light source. Different dimming techniques can be used. For example, the dimmer can be a TRIAC dimmer or an on/off switch dimmer. Thus, for different types of dimmers, the controller has different structures, thereby affecting the flexibility of the controller used for powering LEDs in different dimming techniques.

SUMMARY

In one embodiment, a controller for controlling dimming of a light source includes a detection pin, an input signal pin, and a monitoring pin. The detection pin is operable for monitoring a rectified voltage and for detecting whether the rectified voltage comes from a TRIAC dimmer or an on/off switch dimmer. The input signal pin is operable for receiving an input signal indicative of the rectified voltage and the controller controls dimming of the light source according to the input signal if the rectified voltage comes from a TRIAC dimmer. The monitoring pin is operable for receiving a monitoring signal indicating an operation of the on/off switch dimmer and the controller controls dimming of the light source according to the monitoring signal if the rectified voltage comes from an on/off switch dimmer.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

FIG. 7A shows waveforms of signals associated with the dimming controller in FIG. 4 operating in a first mode, in accordance with one embodiment of the present invention.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
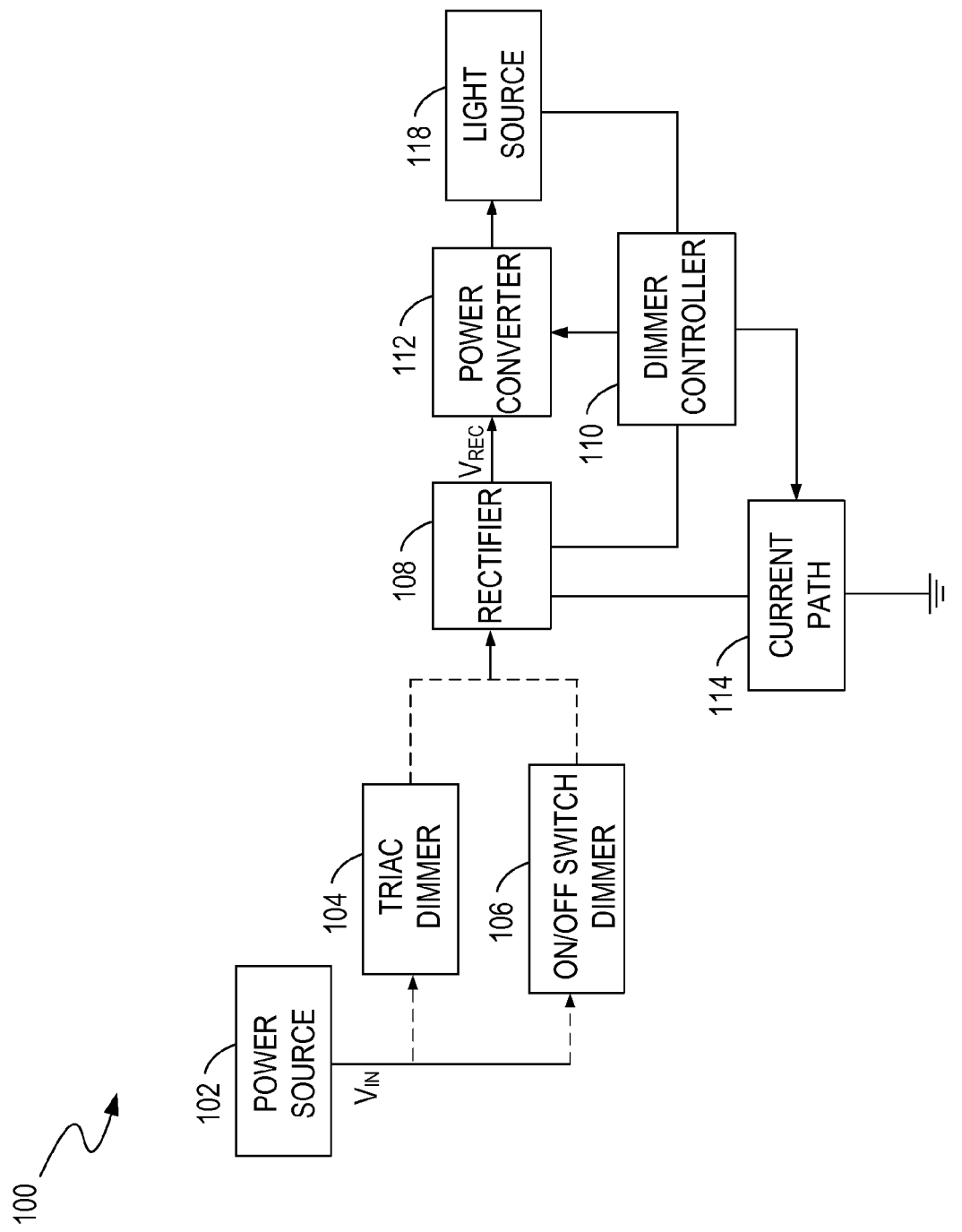
FIG. 1 shows a block diagram of a light source driving circuit, in accordance with one embodiment of the present invention.

FIG. 1 shows a block diagram of a light source driving circuit 100, in accordance with one embodiment of the present invention. The light source driving circuit 100 includes a power source 102, e.g., an AC power source, a rectifier 108 for rectifying an AC voltage from a TRIAC dimmer 104 or an on/off switch dimmer 106 to provide a rectified voltage $V_{REC}$, and a power converter 112 for receiving the rectified voltage $V_{REC}$ and generating regulated power to the light source 118. Advantageously, a dimming controller 110 monitors the rectified voltage $V_{REC}$ from the rectifier 108 and detects whether the AC voltage comes from the TRIAC dimmer 104 or the on/off switch dimmer 106. Upon detection of the type of the dimmer, the dimming controller 110 adjusts the output power of the power converter 112 to control dimming of the light source 118 according to the type of the dimmer. For example, if the TRIAC dimmer 104 is detected, the dimming controller 110 controls the dimming according to the operation of the TRAIC dimmer 104 and enables a current path 114 to maintain a holding current of the TRIAC dimmer 104. If the on/off switch dimmer 106 is detected, the dimming controller 110 controls the dimming according to the operation of the on/off switch dimmer 106.

Figure 2A:
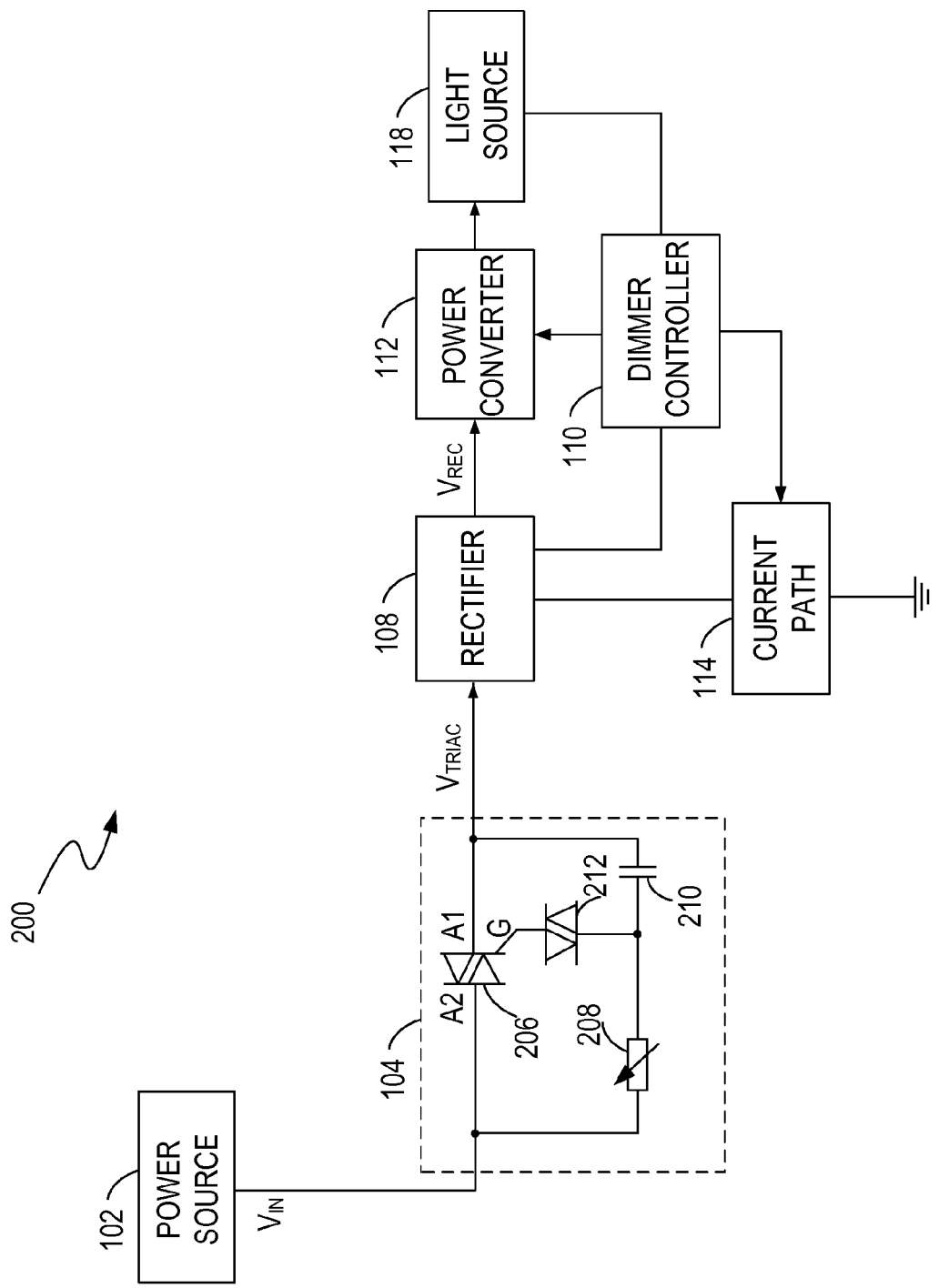
FIG. 2A shows a diagram of a light source driving circuit utilizing a TRIAC dimmer, in accordance with one embodiment of the present invention.

FIG. 2A shows a diagram of a light source driving circuit 200 utilizing a TRIAC dimmer 104, in accordance with one embodiment of the present invention. Elements labeled the same as in FIG. 1 have similar functions. The light source driving circuit 200 includes a power source 102, e.g., an AC power source, a TRIAC dimmer 104 for receiving an AC input voltage $V_{IN}$ from the power source 102 and for generating an AC voltage $V_{TRIAC}$, a rectifier 108 for rectifying the AC voltage $V_{TRIAC}$ from the TRIAC dimmer 104 to provide a rectified voltage $V_{REC}$, and a power converter 112 for receiving the rectified voltage $V_{REC}$ and generating regulated power to the light source 118. Advantageously, a dimming controller 110 receives a signal indicating the rectified voltage $V_{REC}$ from the rectifier 108 and determines that the AC voltage received by the rectifier 108 comes from the TRIAC dimmer 104. The dimming controller 110 adjusts the output power of the power converter 112 to control dimming of the light source 118 accordingly. In one embodiment, the dimming controller 110 is further operable for conducting a current path 114 to maintain a holding current of the TRIAC dimmer 104.

In the example of FIG. 2A, the TRIAC dimmer 104 includes a triac 206 coupled between the power source 102 and the rectifier 108. The triac 206 has a first terminal A1, a second terminal A2 and a gate G. The TRIAC dimmer 104 further includes an adjustable resistor 208 coupled in series with a capacitor 210, and a diac 212 having one end coupled to the capacitor 210 and the other end coupled to the gate G of the triac 206. The triac 206 is a bidirectional switch which can conduct current in either direction when it is triggered. The triac 206 can be triggered by a positive or a negative voltage applied to the gate G. Once triggered, the triac 206 continues to conduct until the current through it drops below a threshold value, i.e., the holding current $I_H$. In other words, in order to keep the triac 206 conducting, a current flowing through the triac 206 is maintained no less than the holding current $I_H$ after the triac 206 is triggered.

Figure 2B:
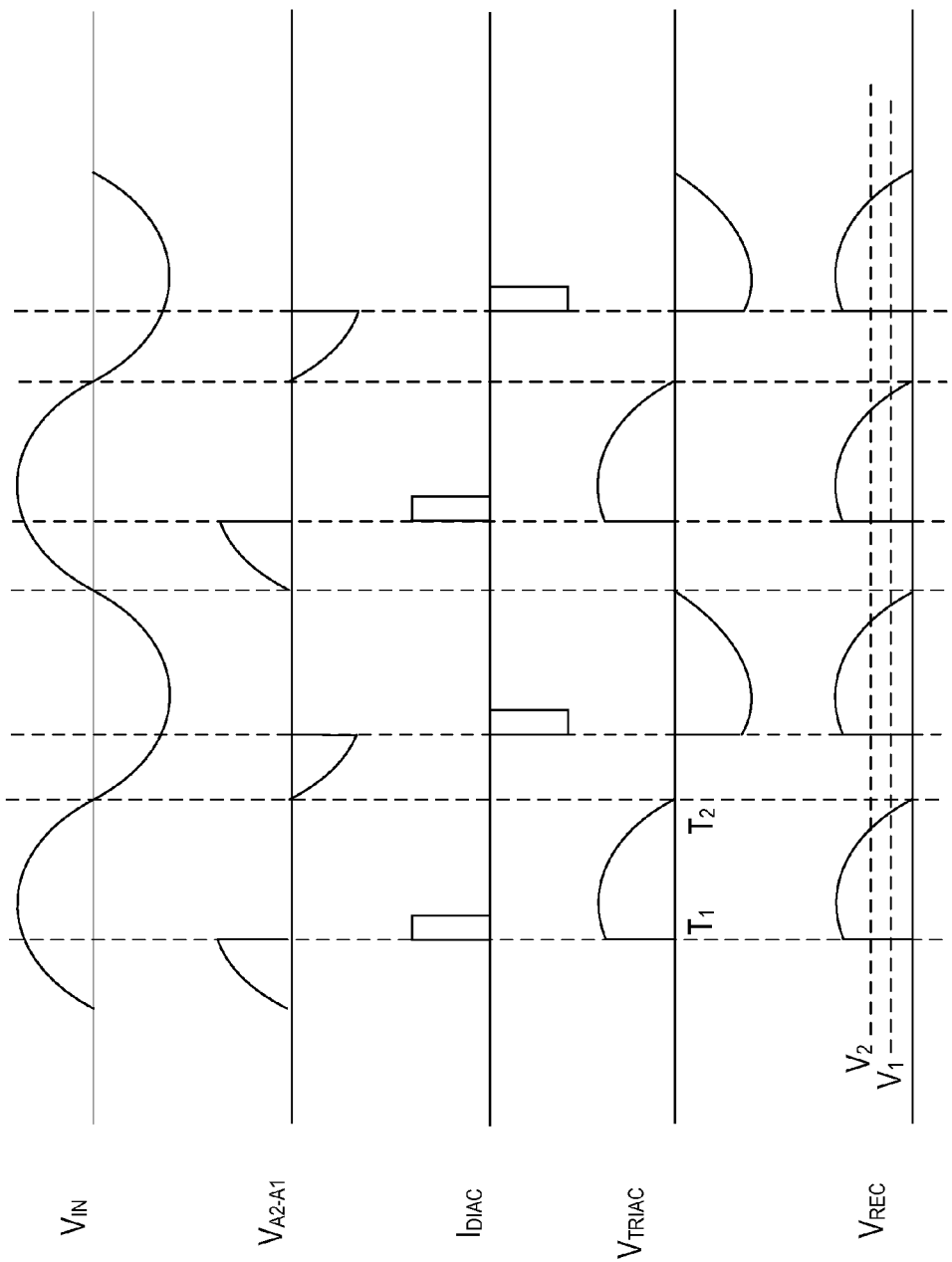
FIG. 2B shows the waveforms associated with the light source driving circuit in FIG. 2A, in accordance with one embodiment of the present invention.

FIG. 2B shows the waveforms associated with the light source driving circuit 200 in FIG. 2A, in accordance with one embodiment of the present invention. More specifically, FIG. 2B shows waveforms of the AC input voltage $V_{IN}$, a voltage $V_{A2-A1}$ between the terminal A1 and terminal A2 of the triac 206, a current $I_{DIAC}$ through the diac 212, the AC voltage $V_{TRIAC}$ provided by the TRIAC dimmer 104, and the rectified voltage $V_{REC}$ from the rectifier 108. In the example of FIG. 2B, the AC input voltage $V_{IN}$ has a sinusoidal waveform. FIG. 2B is described in combination with FIG. 2A.

Initially, the triac 206 is turned off, and the voltage $V_{A2-A1}$ between the terminal A1 and terminal A2 increases with the AC input voltage $V_{IN}$. At time $T_1$, the voltage across the capacitor 210 turns on the diac 212. The diac 212 generates a current pulse applied to the gate G of the triac 206. The triac 206 is turned on in response to the current pulse. As a result, the AC input voltage $V_{IN}$ passes to the rectifier 108, and a current flows through the triac 206. At time $T_2$ which is near the end of the first half cycle of the AC input voltage $V_{IN}$, the triac 206 is turned off because the current through the triac 206 falls below the holding current of the triac 206. In the second half cycle of the input voltage $V_{IN}$, the triac 206 is turned on again when the voltage across the capacitor 210 turns on the diac 212. By increasing or decreasing the resistance of the adjustable resistor 208, the current charging the capacitor 210 is varied such that the diac 212 can be conducted at a different phase angle. Consequently, the triac 206 can be turned on with an adjustable conducting angle depending on the resistance of the adjustable resistor 208. The rectifier 108 converts the negative portion of the AC voltage $V_{TRIAC}$ to corresponding positive portion to generate the rectified voltage $V_{REC}$.

Figure 3A:
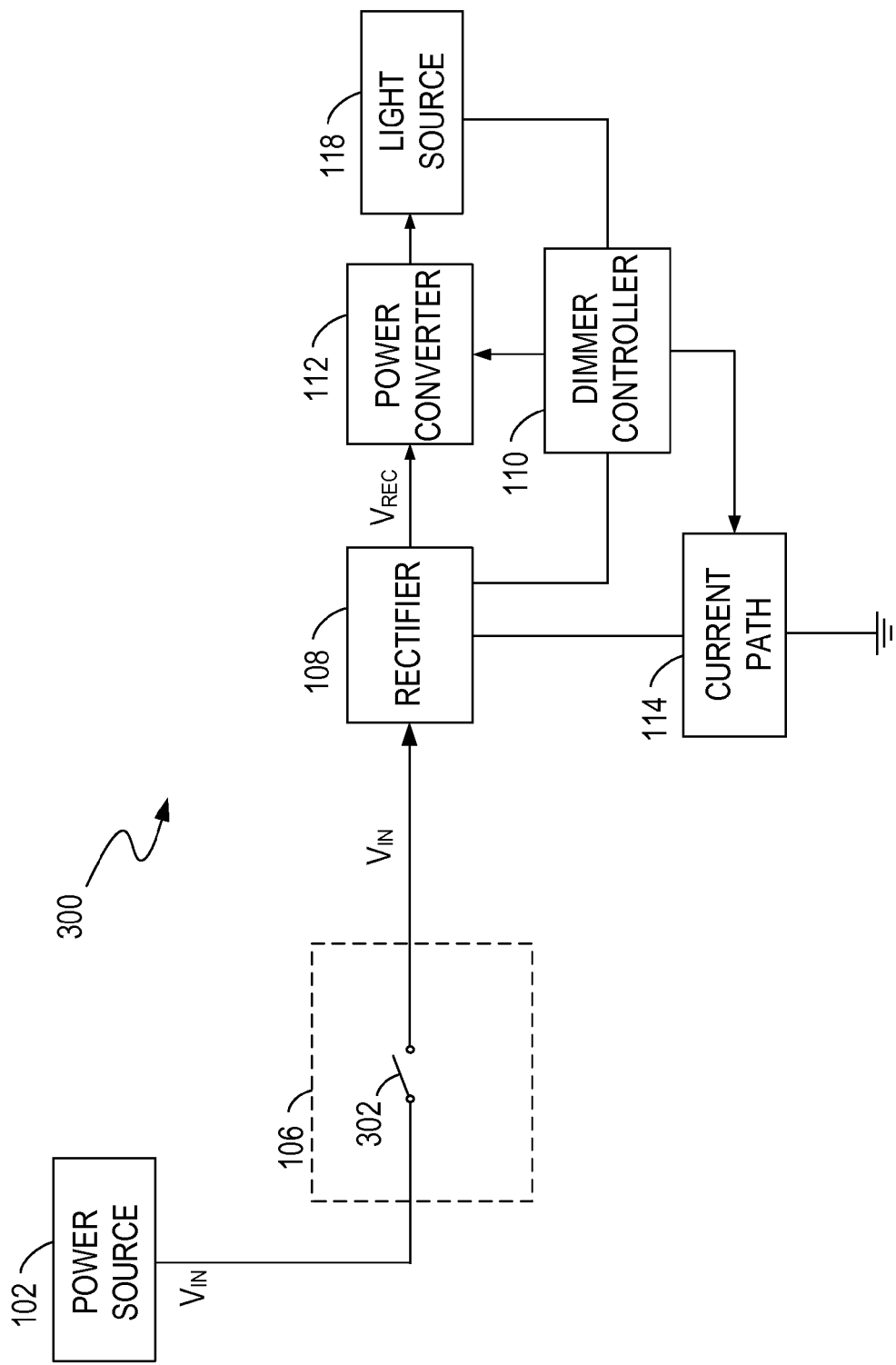
FIG. 3A shows a diagram of a light source driving circuit utilizing an on/off switch dimmer, in accordance with one embodiment of the present invention.
Figure 3B:
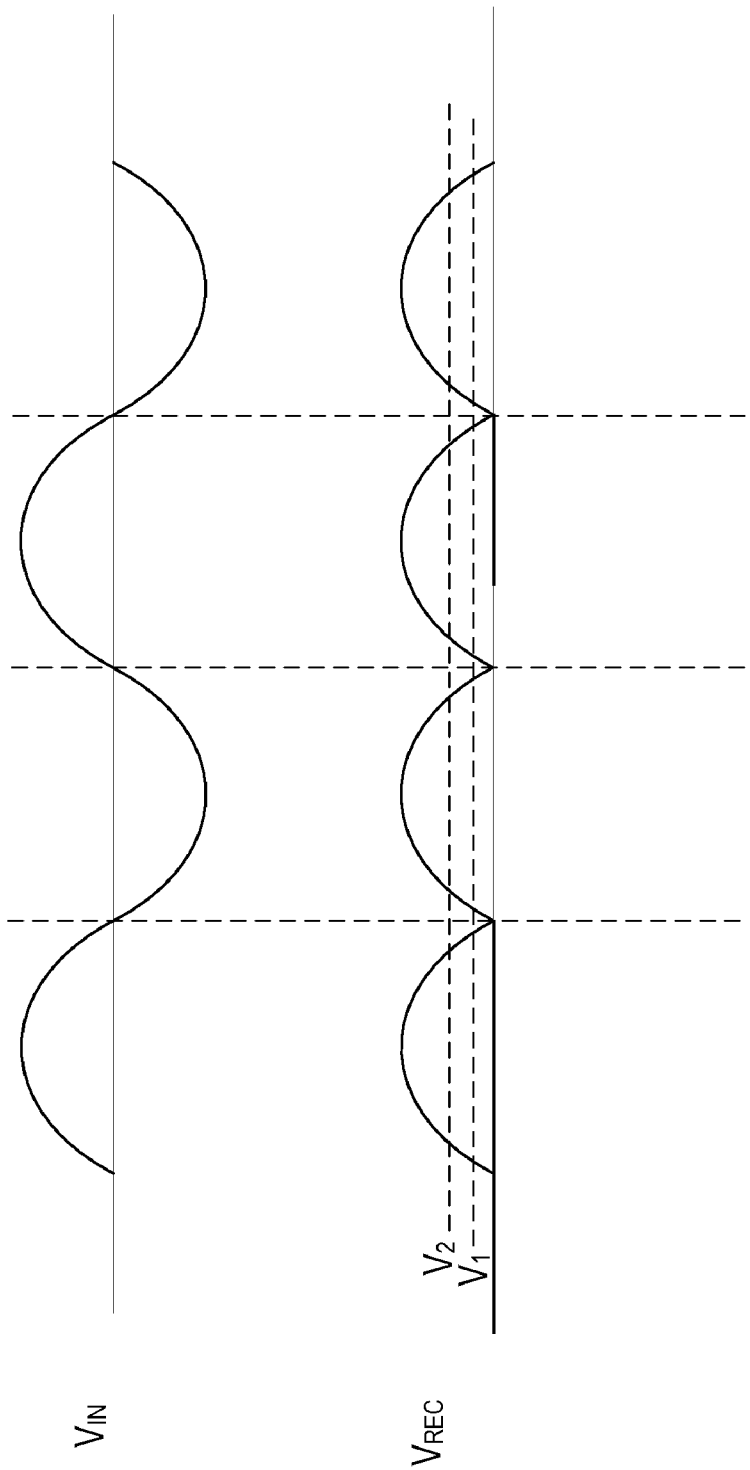
FIG. 3B shows the waveforms associated with the light source driving circuit in FIG. 3A when the switch in the on/off switch dimmer is on, in accordance with one embodiment of the present invention.

FIG. 3A shows a diagram of a light source driving circuit 300 utilizing an on/off switch dimmer 106, in accordance with one embodiment of the present invention. Elements labeled the same as in FIG. 1 have similar functions. FIG. 3B shows the waveforms associated with the light source driving circuit 300 in FIG. 3A when a switch 302 in FIG. 3A is on, in accordance with one embodiment of the present invention. FIG. 3A is described in combination with FIG. 3B.

The light source driving circuit 300 includes a power source 102, e.g., an AC power source, an on/off switch dimmer 106 coupled between the power source 102 and a rectifier 108, a power converter for receiving a rectified voltage $V_{REC}$ from the rectifier 108 and generating regulated power to the light source 118. Advantageously, a dimming controller 110 receives a signal indicating the rectified voltage $V_{REC}$ from the rectifier 108 and determines that the AC voltage received by the rectifier 108 comes from the on/off switch dimmer 106. The dimming controller 110 adjusts the output power of the power converter 112 to control dimming of the light source 118 accordingly.

In the example of FIG. 3A, the on/off switch dimmer 106 includes a switch 302. When the switch 302 is on, the AC input voltage $V_{IN}$ is applied to the rectifier 108. The rectifier 108 rectifies the AC input voltage $V_{IN}$ to a rectified voltage $V_{REC}$. The rectifier 108 converts the negative portion of the AC input voltage $V_{IN}$ to corresponding positive portion to generate the rectified voltage $V_{REC}$.

Figure 4:
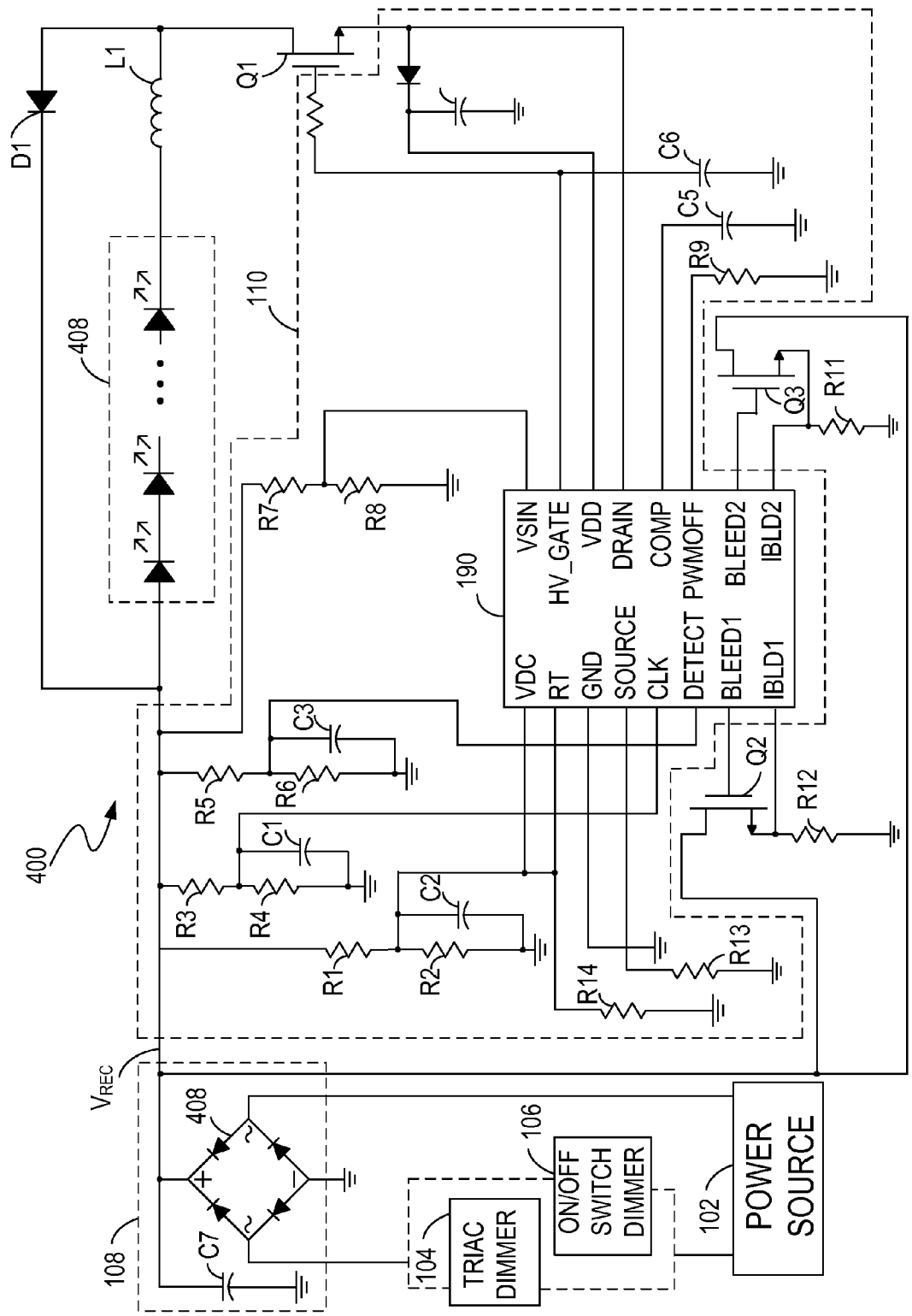
FIG. 4 shows a schematic diagram of a light source driving circuit, in accordance with one embodiment of the present invention.

FIG. 4 shows a schematic diagram of a light source driving circuit 400, in accordance with one embodiment of the present invention. Elements labeled the same as in FIG. 3 have similar functions. In the example of FIG. 4, the light source driving circuit 400 drives an LED string 408. The light source driving circuit 400 can be used to drive various types of light sources. The rectifier 108 can be a bridge rectifier including four diodes 408 and a capacitor C7. The power converter 112 includes an inductor L1, a diode D1 and a switch Q1. The switch Q1 is coupled to the LED string 408 and is turned on or off by the dimming controller 110.

In one embodiment, the dimming controller 110 includes a control block 190. The control block 190 can be, but is not limited to, an integrated circuit. In one embodiment, the control block 190 includes pins VDC, RT, GND, SOURCE, CLK, DETECT, VSIN, HV_GATE, VDD, DRAIN, COMP, PWMOFF, BLEED1, BLEED2, IBLD1 and IBLD2. The detection pin DETECT receives a signal indicating the rectified voltage $V_{REC}$ and detects whether the rectified voltage $V_{REC}$ comes from a TRIAC dimmer 104 or an on/off switch dimmer 106. In the example of FIG. 4, the detection pin DETECT is coupled to the output of the rectifier 108 via a capacitor C3 and resistors R5 and R6.

The input signal pin VSIN receives a signal $V_{SIN}$ indicative of the rectified voltage $V_{REC}$. In the example of FIG. 4, the input signal pin VSIN is coupled to the output of the rectifier 108 via resistors R7 and R8. The average signal pin VDC receives a signal $V_{DC}$ indicative of an average $V_{AVG}$ of the rectified voltage $V_{REC}$. In the example of FIG. 4, the average signal pin VDC is coupled to the output of the rectifier 108 via a capacitor C2 and resistors R1 and R2.

A first bleeding control pin BLEED1 controls a switch Q2 for conducting a first current path including the switch Q2 and a resistor R12 to maintain a holding current of the TRIAC dimmer 104 if the TRIAC dimmer 104 is coupled to the rectifier 108. More specifically, the switch Q2 can be turned on if the signal received by the pin DETECT indicates that the TRIAC dimmer 104 is coupled to the rectifier 108 and the signal $V_{SIN}$ received by the pin VSIN is greater than the signal $V_{DC}$ received by the pin VDC, in one embodiment. In the example of FIG. 4, the bleeding control pin BLEED1 controls the switch Q2 linearly according to a sensing signal, e.g., a voltage across the resistor R12, received by the pin IBLD1.

A second bleeding control pin BLEED2 controls a switch Q3 for conducting a second current path including the switch Q3 and a resistor R11 to maintain a holding current of the TRIAC dimmer 104 if the TRIAC dimmer 104 is coupled to the rectifier 108. More specifically, the switch Q3 can be turned on if the signal received by the pin DETECT indicates that the TRIAC dimmer 104 is coupled to the rectifier 108 and the signal $V_{SIN}$ received by the pin VSIN is less than the signal $V_{DC}$ received by the pin VDC, in one embodiment. In the example of FIG. 4, the bleeding control pin BLEED2 controls the switch Q3 linearly according to a sensing signal, e.g., a voltage across the resistor R11, received by the pin IBLD2.

The pin CLK receives a switch monitoring signal indicating an operation of the on/off switch dimmer 106 if the on/off switch dimmer 106 is coupled to the rectifier 108. In the example of FIG. 4, the pin CLK is coupled to the output of the rectifier 108 via a capacitor C1 and resistors R3 and R4. If the on/off switch dimmer 106 is coupled to the rectifier 108, a voltage across the resistor R4 drops to zero when the on/off switch dimmer 106 is turned off. Thus, a switch monitoring signal indicating a turn-off operation of the on/off switch dimmer 106 is detected by the pin CLK. The voltage across the resistor R4 rises to a predetermined voltage when the on/off switch dimmer 106 is turned on. Thus, a switch monitoring signal indicating a turn-on operation of the on/off switch dimmer 106 is detected by the pin CLK.

Moreover, the pin HV_GATE controls the switch Q1. In operation, if the on/off switch dimmer 106 is utilized and a turn-on operation of the on/off switch dimmer 106 is detected at the pin CLK, the control block 190 turns on the switch Q1. If a turn-off operation of the on/off switch dimmer 106 is detected at the pin CLK, the control block 190 turns off the switch Q1 such that the LED string 408 is turned off after the inductor L1 completes discharging. The pin VDD is coupled to the switch Q1 for providing power to the control block 190. The pin DRAIN is coupled to the switch Q1. The pin SOURCE is coupled to the resistor R13. The pin COMP is coupled to the capacitor C5. The pin GND is coupled to ground. The pin RT is coupled to ground via a resistor R14 for determining a frequency of a pulse signal generated by the control block 190.

Figure 5:
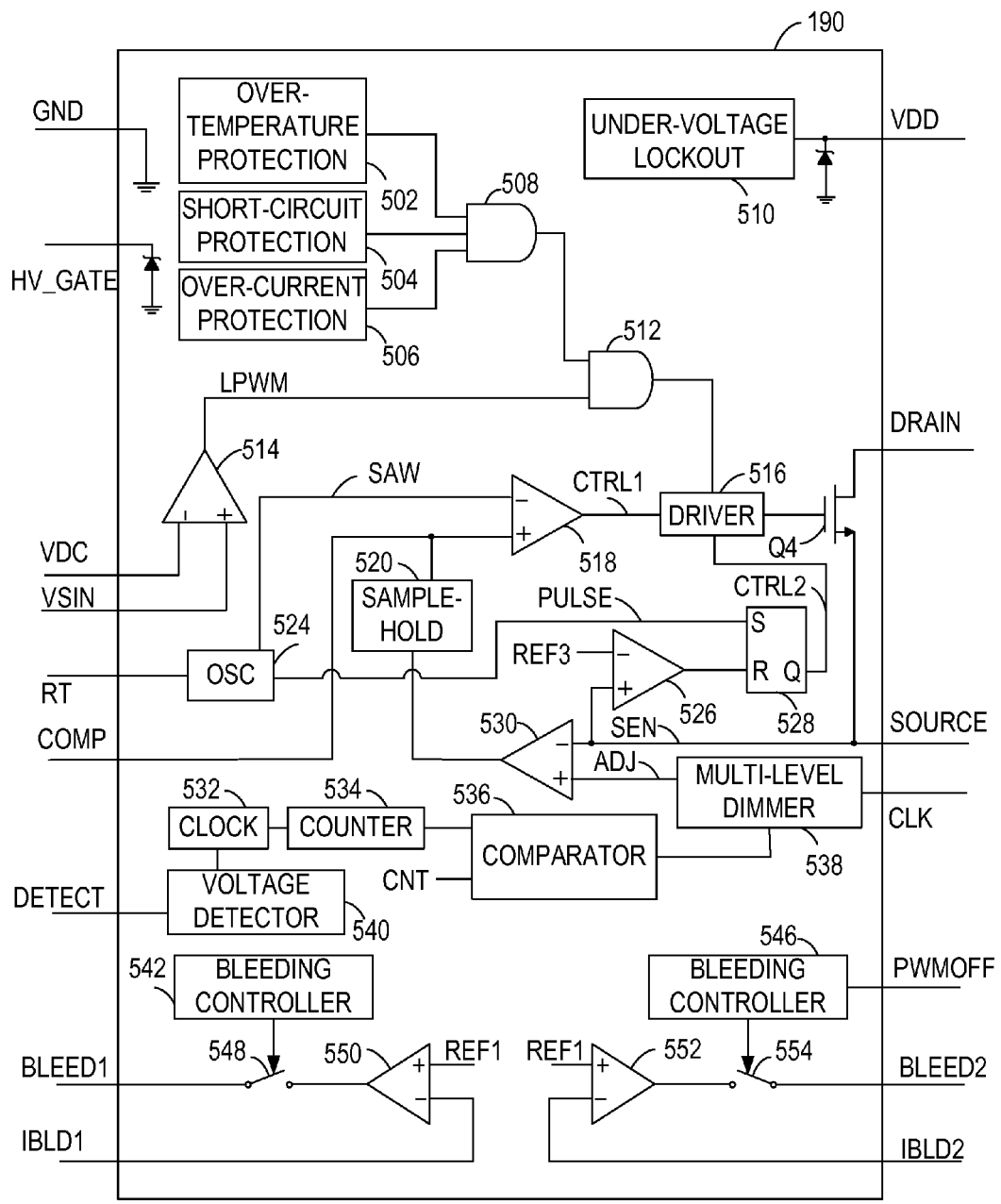
FIG. 5 shows an example of a control block in FIG. 4, in accordance with one embodiment of the present invention.

FIG. 5 shows an example of a control block 190 in FIG. 4, in accordance with one embodiment of the present invention. FIG. 5 is described in combination with FIG. 4.

The control block 190 includes a driver 516 for controlling a switch Q4 coupled between the pin DRAIN and the pin SOURCE to control a current of the LED string 408, a comparator 514 for comparing an input signal $V_{SIN}$ indicative of the rectified voltage $V_{REC}$ with an average signal $V_{DC}$ indicative of an average $V_{AVG}$ of the rectified voltage $V_{REC}$ to generate a pulse-width modulation signal LPWM, a multi-level dimmer 538 coupled to the pin CLK for adjusting brightness of the LED string 408 in response to the operation of the on/off switch dimmer 106, a voltage detector 540 for monitoring the rectified voltage $V_{REC}$, a bleeding controller 542 for controlling an error amplifier 550 to control the first current path including the switch Q2 and the resistor R12 shown in FIG. 4, a bleeding controller 546 for controlling an error amplifier 552 to control the second current path including the switch Q3 and the resistor R11 shown in FIG. 4. The control block 190 further includes an over-temperature protection unit 502, a short-circuit protection unit 504, an over-current protection unit 506 and an under-voltage lockout unit 510.

Figure 6:
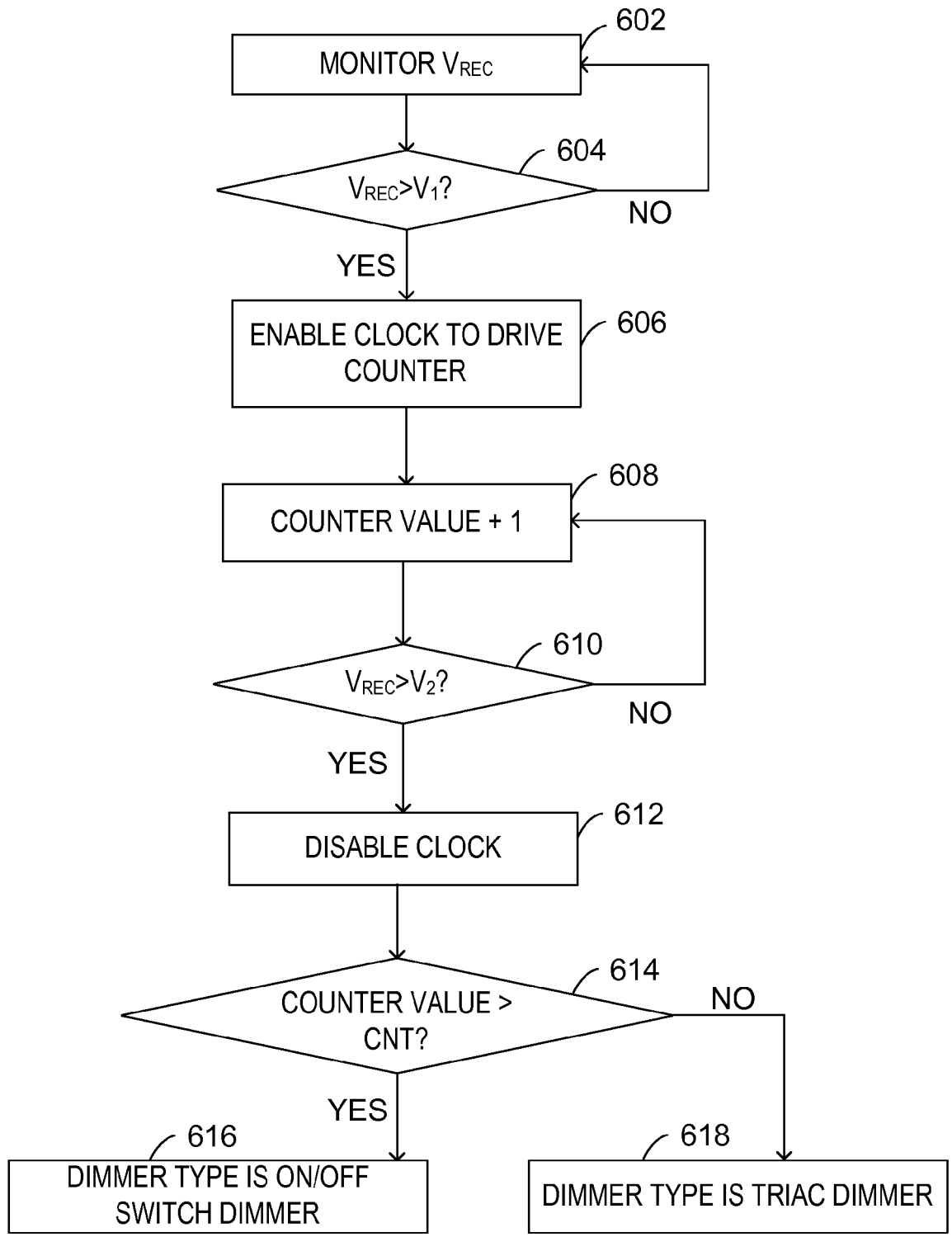
FIG. 6 shows a flowchart of an example of a method for determining whether the rectified voltage comes from a TRIAC dimmer or an on/off switch dimmer, in accordance with one embodiment of the present invention.

In the example of FIG. 5, the control block 190 determines whether the rectified voltage $V_{REC}$ comes from a TRIAC dimmer 104 or an on/off switch dimmer 106 by using the voltage detector 540, a clock 532, a counter 534, and a comparator 536. FIG. 6 shows a flowchart of an example of a method for determining whether the rectified voltage $V_{REC}$ comes from a TRIAC dimmer 104 or an on/off switch dimmer 106, in accordance with one embodiment of the present invention. FIG. 6 is described in combination with FIG. 5.

In block 602, the voltage detector 540 monitors the rectified voltage $V_{REC}$ by receiving a signal indicating the rectified voltage $V_{REC}$ via the detection pin DETECT. In block 604, if the rectified voltage $V_{REC}$ is greater than a first preset voltage $V_1$, the flowchart goes to block 606 and the voltage detector 540 enables the clock 532 to drive the counter 534. In block 608, a counter value of the counter 534 increases by 1 in response to each clock pulse generated by the clock 532. In block 610, if the rectified voltage $V_{REC}$ is less than a second preset voltage $V_2$, the flowchart goes back to block 608. In block 610, if the voltage of the rectified voltage $V_{REC}$ is greater than the second preset voltage $V_2$, the flowchart goes to block 612 and the voltage detector 540 disables the clock 532. In block 614, the counter value is compared with a reference value CNT by the comparator 536. In block 616, if the counter value is greater than CNT, the comparator 536 generates a selection signal indicating that the rectified voltage $V_{REC}$ comes from the on/off switch dimmer 106. In block 618, if the counter value is less than CNT or equal to CNT, the comparator 536 generates a selection signal indicating that the rectified voltage $V_{REC}$ comes from the TRIAC dimmer 104.

Referring back to FIG. 5, if the control block 190 determines that the rectified voltage $V_{REC}$ comes from the on/off switch dimmer 106, the SR flip-flop 528, the bleeding controller 542, the error amplifier 550, the bleeding controller 546, and the error amplifier 552 are disabled, in one embodiment. The multi-level dimmer 538 is enabled to output a dimming signal ADJ according to the operation of the on/off switch dimmer 106. The multi-level dimmer 538 receives a switch monitoring signal indicating an operation of the on/off switch dimmer 106 via the pin CLK. For example, a voltage of the dimming signal ADJ decreases from a first level to a second level in response to a turn-off operation of the on/off switch dimmer 106. An amplifier 530 compares the dimming signal ADJ with a sensing signal SEN received from the current sensing pin SOURCE. The sensing signal SEN indicates a current of the LED string 408. A sample-hold circuit 520 receives the output of the amplifier 530. A comparator 518 generates a control signal CTRL1 to control the switch Q4 by comparing a sawtooth signal SAW generated by an oscillator 524 with the output of the sample-hold circuit 520. The comparator 514 is coupled to the input signal pin VSIN and the average signal pin VDC, and compares an input signal $V_{SIN}$ indicative of the rectified voltage $V_{REC}$ with an average signal $V_{DC}$ indicative of an average $V_{AVG}$ of the rectified voltage $V_{REC}$ to generate a pulse-width modulation signal LPWM. In one embodiment, if $V_{SIN}$ is greater than $V_{DC}$, the pulse-width modulation signal LPWM is in a first state (e.g., logic 1) and the switch Q4 is controlled by the output of the comparator 518. More specifically, in one embodiment, if the output of the sample-hold circuit 520 is greater than the sawtooth signal SAW, the comparator 518 generates the control signal CTRL1 in a first state (e.g., logic 1) to turn on the switch Q4. If the output of the sample-hold circuit 520 is less than the sawtooth signal SAW, the comparator 518 generates the control signal CTRL1 in a second state (e.g., logic 0) to turn off the switch Q4. Therefore, when the pulse-width modulation signal LPWM is in a first state, the duty cycle of the control signal CTRL1 varies according to the dimming signal ADJ which is further determined by the switch monitoring signal indicating the operation of the on/off switch dimmer 106.

If $V_{SIN}$ is less than $V_{DC}$, the pulse-width modulation signal LPWM is in a second state (e.g., logic 0) and the switch Q4 remains off during the second state of the pulse-width modulation signal LPWM. In other words, the switch Q4 is turned on and off alternately according to the control signal CTRL1 during the first state of the pulse-width modulation signal LPWM, and the switch Q4 remains off during the second state of the pulse-width modulation signal LPWM.

In one embodiment, if the control block 190 determines that the rectified voltage $V_{REC}$ comes from the TRIAC dimmer 104, the multi-level dimmer 538, the amplifier 530, the sample-hold circuit 520, and the comparator 518 are disabled. The SR flip-flop 528, the bleeding controller 542, the error amplifier 550, the bleeding controller 546, and the error amplifier 552 are enabled.

The comparator 514 compares an input signal $V_{SIN}$ indicative of the rectified voltage $V_{REC}$ with an average signal $V_{DC}$ indicative of an average $V_{AVG}$ of the rectified voltage $V_{REC}$ to generate a pulse-width modulation signal LPWM. If $V_{SIN}$ is greater than $V_{DC}$, the pulse-width modulation signal LPWM is in a first state (e.g., logic 1). During the first state of the pulse-width modulation signal LPWM, the switch Q1 shown in FIG. 4 is on and the switch Q4 is controlled by the output CTRL2 of the SR flip-flop 528. More specifically, the S input of the SR flip-flop 528 receives a pulse signal PULSE generated by the oscillator 524. The SR flip-flop 528 outputs a logic 1 in response to each pulse in the pulse signal to turn on the switch Q4. A comparator 526 compares a reference signal REF3 with the sensing signal SEN received from the current sensing pin SOURCE. The reference signal REF3 determines a peak level of the current of the LED string 408. The sensing signal SEN indicates a current of the LED string 408 when the switch Q4 is on. If the sensing signal SEN increases to REF3, the comparator 526 generates a logic 1 at the R input of the SR flip-flop 528 such that the SR flip-flop 528 outputs a logic 0 to turn off the switch Q4. If $V_{SIN}$ is less than $V_{DC}$, the pulse-width modulation signal LPWM is in a second state (e.g., logic 0) and the switches Q1 and Q4 are turned off. In other words, the switch Q4 is turned on and off alternately according to output of the SR flip-flop 528 during the first state of the pulse-width modulation signal LPWM, and the switch Q4 remains off during the second state of the pulse-width modulation signal LPWM.

The bleeding controller 542 is operable for turning on a switch 548 coupled between the pin BLEED1 and the error amplifier 550 to conduct a first current path including the switch Q2 and the resistor R12 (shown in FIG. 4) during a first state of the pulse-width modulation signal LPWM. As such, a current flows from the rectifier 108 through the switch Q2 and the resistor R12 to ground. The error amplifier 550 receives a reference signal REF1 and a sensing signal indicating a voltage across the resistor R12 and controls the switch Q2 linearly to maintain the current through the switch Q2 and the resistor R12 no less than the holding current of the TRIAC dimmer 104.

The bleeding controller 546 is operable for turning on a switch 554 coupled between the pin BLEED2 and the error amplifier 552 to conduct a second current path including the switch Q3 and the resistor R11 (shown in FIG. 4) during a second state of the pulse-width modulation signal LPWM. As such, a current flows from the rectifier 108 through the switch Q3 and the resistor R11 to ground. The error amplifier 552 receives the reference signal REF1 and a sensing signal indicating a voltage across the resistor R11 and controls the switch Q3 linearly to maintain the current through the switch Q3 and the resistor R11 no less than the holding current of the TRIAC dimmer 104. Moreover, in one embodiment, the bleeding controller 546 receives a setting signal from the pin PWMOFF. The setting signal determines a minimum duty cycle $D_{MIN}$ of the pulse-width modulation signal LPWM. If the duty cycle decreases to the minimum duty cycle $D_{MIN}$, the control block 190 turns off the switch Q4 and the bleeding controller 546 conducts the second current path. Therefore, in one embodiment, the bleeding controller 546 turns on the switch 554 to conduct the second current path when either of the following conditions occurs: when the pulse-width modulation signal LPWM is in the second state or when the duty cycle of the pulse-width modulation signal LPWM decreases to the minimum duty cycle $D_{MIN}$.

When the pulse-width modulation signal LPWM is in the first state, the switch Q4 is turned on and off alternately. Thus, a current flows through the LED string 408 to ground during the first state of the LPWM. The control block 190 is operable for conducting the first current path to maintain the holding current of the TRIAC dimmer 104. When the pulse-width modulation signal LPWM is in the second state, the switch Q4 remains off. Thus, no current flows through the LED string 408 to ground during the second state of the LPWM. The control block 190 is operable for conducting the second current path to maintain the holding current of the TRIAC dimmer 104. As such, to maintain the same holding current of the TRIAC dimmer 104, the bleeding current flowing through the first current path during the first state of the LPWM is less than the bleeding current flowing through the second current path during the second state of the LPWM. Although the example of FIG. 4 shows two current paths, i.e., one includes the switch Q2 and resistor R12 and the other includes the switch Q3 and resistor R11, the invention is not so limited. In another embodiment, one current path can be employed to maintain the holding current of the TRIAC dimmer 104.

As discussed in the example of FIG. 5, when the TRIAC dimmer 104 is used, the dimming of the light source 118 is controlled by comparing the input signal $V_{SIN}$ indicative of the rectified voltage $V_{REC}$ with the average signal $V_{DC}$ indicative of an average $V_{AVG}$ of the rectified voltage $V_{REC}$, in one embodiment. Alternatively, when the TRIAC dimmer 104 is used, the dimming of the light source 118 can also be controlled by calculating the conducting angle of the rectified voltage $V_{REC}$.

During the operation, if any abnormal situation such as over temperature, short circuit or over current is detected, the over-temperature protection unit 502, short-circuit protection unit 504, or over-current protection unit 506 can generate a control signal, e.g., logic 0, to the driver 516 via the AND gates 508 and 512 to turn off the switch Q4.

FIG. 7A shows waveforms of signals associated with the dimming controller in FIG. 4 operating in a first mode, i.e., the on/off switch dimming mode, in accordance with one embodiment of the present invention. More specifically, FIG. 7A shows the status of the switch 302, the rectified voltage $V_{REC}$ from the rectifier 108, the pulse-width modulation signal LPWM generated by the comparator 514, the dimming signal ADJ generated by the multi-level dimmer 538, the sawtooth signal SAW provided by the oscillator 524, the output $V_{520}$ of the sample-hold circuit 520, and the control signal CTRL1 generated by the comparator 518, when the on/off switch dimmer 106 is utilized. FIG. 7A is described in combination with FIG. 4 and FIG. 5.

In operation, when the switch 302 is on, the comparator 514 compares an input signal $V_{SIN}$ indicative of the rectified voltage $V_{REC}$ with an average signal $V_{DC}$ indicative of an average $V_{AVG}$ of the rectified voltage $V_{REC}$ to generate the pulse-width modulation signal LPWM. In one embodiment, if $V_{SIN}$ is greater than $V_{DC}$, the pulse-width modulation signal LPWM is in a first state (e.g., logic 1). If $V_{SIN}$ is less than $V_{DC}$, the pulse-width modulation signal LPWM is in a second state (e.g., logic 0). The oscillator 524 provides the sawtooth signal SAW. When the pulse-width modulation signal LPWM is in the first state, the comparator 518 generates the control signal CTRL1 to turn the switch Q4 (shown in FIG. 4) on and off alternately by comparing the sawtooth signal SAW with the output $V_{520}$ of the sample-hold circuit 520. $V_{520}$ is proportional to the dimming signal ADJ which is generated by the multi-level dimmer 538, in one embodiment. In one embodiment, if the output of the sample-hold circuit 520 is greater than the sawtooth signal, the comparator 518 generates the control signal CTRL1 in a first state (e.g., logic 1) to turn on the switch Q4. If the output of the sample-hold circuit 520 is less than the sawtooth signal, the comparator 518 generates the control signal CTRL1 in a second state (e.g., logic 0) to turn off the switch Q4. When the pulse-width modulation signal LPWM is in the second state, the control signal CTRL1 is zero and thus the switch Q4 remains off.

If the switch 302 is turned off, the switch monitoring signal indicating a turn-off operation of the on/off switch dimmer 106 is received by the multi-level dimmer 538 via the pin CLK. Accordingly, when the switch 302 is turned on again, the multi-level dimmer 538 decreases a voltage of the dimming signal ADJ from a first level to a second level, in one embodiment. The voltage of the output $V_{520}$ of the sample-hold circuit 520 decreases accordingly. As a result, a duty cycle of the control signal CTRL1 is decreased. Therefore, the brightness of the LED string 408 is reduced. In other words, when the on/off switch dimmer 106 is used, the duty cycle of the control signal CTRL1 varies according to the dimming signal ADJ which is further determined by the switch monitoring signal received by pin CLK.

Figure 7B:
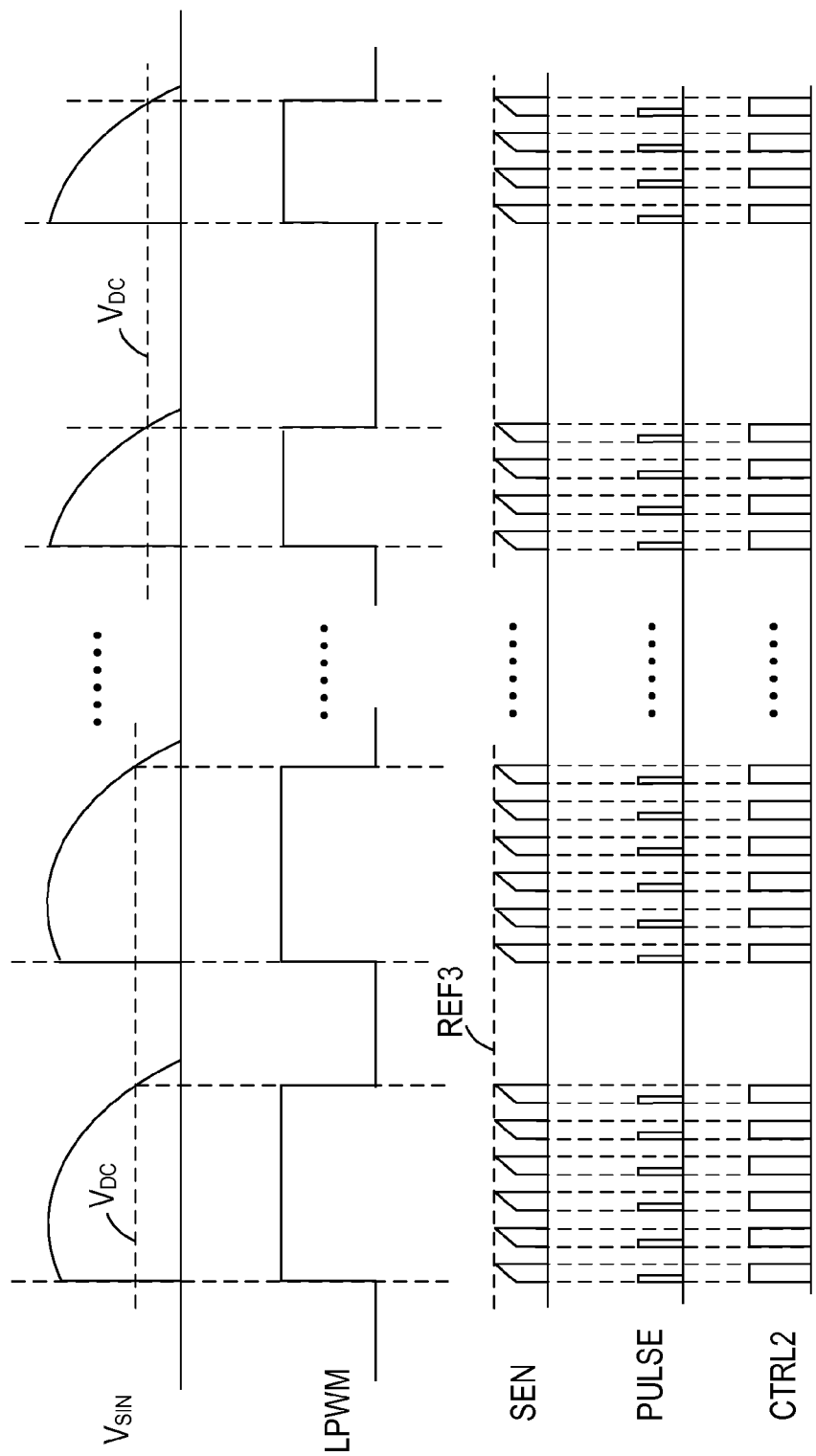
FIG. 7B shows waveforms of signals associated with the dimming controller in FIG. 4 operating in a second mode, in accordance with one embodiment of the present invention.

FIG. 7B shows waveforms of signals associated with the dimming controller in FIG. 4 operating in a second mode, i.e., the TRIAC dimming mode, in accordance with one embodiment of the present invention. More specifically, FIG. 7B shows the rectified voltage $V_{REC}$ from the rectifier 108, the pulse-width modulation signal LPWM generated by the comparator 514, the sensing signal SEN received from the current sensing pin SOURCE of the control block 190, the pulse signal PULSE provided by the oscillator 524, and the output CTRL2 of the SR flip-flop 528, when the TRIAC dimmer 104 is utilized. FIG. 7B is described in combination with FIG. 4 and FIG. 5.

In one embodiment, the comparator 514 compares an input signal $V_{SIN}$ indicative of the rectified voltage $V_{REC}$ with an average signal $V_{DC}$ indicative of an average $V_{AVG}$ of the rectified voltage $V_{REC}$ to generate the pulse-width modulation signal LPWM. If $V_{SIN}$ is greater than $V_{DC}$, the pulse-width modulation signal LPWM is in a first state (e.g., logic 1). If $V_{SIN}$ is less than $V_{DC}$, the pulse-width modulation signal LPWM is in a second state (e.g., logic 0). The oscillator 524 provides the pulse signal PULSE. The output CTRL2 of the SR flip-flop 528 turns to logic 1 in response to each pulse in the pulse signal, in one embodiment. If the switch Q4 is turned on, a current through the LED string 408 increases such that the sensing signal SEN increases. If the sensing signal SEN increases to REF3, the comparator 526 generates a logic 1 at the R input of the SR flip-flop 528 such that the output CTRL2 of the SR flip-flop 528 turns to logic 0.

If a user adjusts the TRIAC dimmer 104 to reduce the conduction time of the triac 206, the duty cycle of the pulse-width modulation signal LPWM decreases. Consequently, the brightness of the LED string 408 decreases. Thus, when the TRIAC dimmer 104 is used, the brightness of the LED string 408 varies according to the rectified voltage $V_{REC}$. In the example of FIG. 7B, the pulse-width modulation signal LPWM is obtained by comparing the input signal $V_{SIN}$ indicative of the rectified voltage $V_{REC}$ with the average signal $V_{DC}$ indicative of an average $V_{AVG}$ of the rectified voltage $V_{REC}$. In alternative embodiment, when the TRIAC dimmer 104 is used, the pulse-width modulation signal LPWM can also be obtained by calculating the conducting angle of the rectified voltage $V_{REC}$. For example, the pulse-width modulation signal LPWM is in the first state (e.g., logic 1) during the conducting angle of the rectified voltage $V_{REC}$. Otherwise, the pulse-width modulation signal LPWM is in the second state (e.g., logic 0).

Accordingly, embodiments in accordance with the present invention provide circuits and methods for controlling dimming of a light source. A dimming controller is capable of detecting whether a TRIAC dimmer or an on/off switch dimmer is coupled between a power source and a power converter. Upon detection of the type of the dimmer, the dimming controller controls the dimming of the light source accordingly. For example, if the TRIAC dimmer is detected, the dimming controller controls the dimming according to the operation of the TRAIC dimmer. If the on/off switch dimmer is detected, the dimming controller controls the dimming according to the operation of the on/off switch dimmer. Advantageously, the dimming controller can be adapted to different types of dimmers and thus its flexibility is enhanced.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A controller for controlling dimming of an LED light source, said controller comprising:
   a detection pin operable for monitoring a rectified voltage and for detecting whether said rectified voltage comes from a TRIAC dimmer or an on/off switch dimmer;
   an input signal pin operable for receiving an input signal indicative of said rectified voltage, wherein said controller is configured to control dimming of said LED light source by controlling a switch in series with said LED light source according to said input signal if said rectified voltage comes from said TRIAC dimmer; and a monitoring pin operable for receiving a monitoring signal indicating an operation of said on/off switch dimmer, wherein said controller is configured to control dimming of said LED light source by controlling said switch according to said monitoring signal if said rectified voltage comes from said on/off switch dimmer.

2. The controller of claim 1, further comprising:
a bleeding control pin operable for conducting a current path to maintain a holding current of said TRIAC dimmer if said rectified voltage comes from said TRIAC dimmer.

3. The controller of claim 1, wherein said controller is configured to control dimming of said LED light source by calculating a conducting angle of said rectified voltage if said rectified voltage comes from said TRIAC dimmer.

4. The controller of claim 1, further comprising:
an average signal pin operable for receiving an average signal indicative of an average of said rectified voltage, wherein said controller is configured to control dimming of said LED light source by comparing said input signal to said average signal if said rectified voltage comes from said TRIAC dimmer.

5. The controller of claim 1, wherein said controller is configured to generate a pulse-width modulation signal, and wherein said controller is operable for turning said switch on and off alternately during a first state of said pulse-width modulation signal, and wherein said switch remains off during a second state of said pulse-width modulation signal.

6. The controller of claim 5, wherein said pulse-width modulation signal is generated by comparing said input signal to an average signal indicative of an average of said rectified voltage.

7. The controller of claim 5, further comprising:
a first bleeding control pin operable for conducting a first current path to maintain a holding current of said TRIAC dimmer if said rectified voltage comes from said TRIAC dimmer; and
a second bleeding control pin operable for conducting a second current path to maintain said holding current of said TRIAC dimmer if said rectified voltage comes from said TRIAC dimmer,
wherein said first bleeding control pin is operable for conducting said first current path during said first state of said pulse-width modulation signal, and wherein said second bleeding control pin is operable for conducting said second current path during said second state of said pulse-width modulation signal.

8. The controller of claim 5, further comprising:
a current sensing pin operable for providing a sensing signal indicative of a current of said LED light source;
a comparator operable for comparing said sensing signal to a predetermined reference,
wherein said switch is turned on and off during said first state of said pulse-width modulation signal according to an output of said comparator and a pulse signal.

9. The controller of claim 5, further comprising:
a current sensing pin operable for providing a sensing signal indicative of a current of said LED light source;
an amplifier operable for comparing said sensing signal to a dimming signal, wherein a level of said dimming signal is determined by said operation of said on/off switch dimmer, wherein said switch is turned on and off during said first state of said pulse-width modulation signal based on an output of said amplifier.

10. The controller of claim 1, further comprising:
a clock generator coupled to said detection pin and operable for generating a clock signal when said rectified voltage is greater than a first preset voltage and less than a second preset voltage; and
a counter coupled to said clock generator and operable for counting pulses of said clock signal.

11. The controller of claim 10, further comprising:
a comparator coupled to said counter and operable for generating a selection signal by comparing a counter value of said counter to a reference value,
wherein said selection signal indicates whether said rectified voltage comes from said TRIAC dimmer or said on/off switch dimmer.

12. A system comprising:
a rectifier operable for rectifying an AC voltage and generating a rectified voltage;
a power converter coupled to said rectifier and operable for receiving said rectified voltage and generating regulated power to a light emitting diode (LED) light source;
a dimming controller operable for detecting whether said AC voltage comes from a TRAIC dimmer or an on/off switch dimmer and for controlling said power converter so as to control dimming of said LED light source,
wherein said dimming controller is operable for controlling dimming of said LED light source by controlling a switch in series with said LED light source according to said rectified voltage if said AC voltage comes from said TRIAC dimmer, and wherein said dimming controller is operable for controlling dimming of said LED light source by controlling said switch according to an operation of said on/off switch dimmer if said AC voltage comes from said on/off switch dimmer.

13. The system of claim 12, wherein said dimming controller is operable for controlling LED dimming of said light source by comparing an input signal indicative of said rectified voltage to an average signal indicative of an average of said rectified voltage if said rectified voltage comes from said TRIAC dimmer.

14. The system of claim 12, wherein said dimming controller is operable for controlling dimming of said LED light source by calculating a conducting angle of said rectified voltage if said rectified voltage comes from said TRIAC dimmer.

15. The system of claim 12, wherein said dimming controller is operable for generating a pulse-width modulation signal, and wherein said switch is switched on and off alternately during a first state of said pulse-width modulation signal, and wherein said switch remains off during a second state of said pulse-width modulation signal.

16. The system of claim 15, wherein said dimming controller is configured to generate said pulse-width modulation signal by comparing an input signal indicative of said rectified voltage to an average signal indicative of an average of said rectified voltage.

17. The system of claim 15, wherein said dimming controller is operable for comparing a sensing signal indicative of a current through said LED light source to a predetermined reference, and wherein said switch is turned on and off during said first state of said pulse-width modulation signal according to a pulse signal and a comparison result of said sensing signal and said predetermined reference.

18. The system of claim 15, wherein said dimming controller is operable for comparing a sensing signal indicative of a current through said LED light source to a dimming signal, wherein a level of said dimming signal is determined by said operation of said on/off switch dimmer, and wherein said switch is turned on and off during said first state of said pulse-width modulation signal according to a sawtooth signal and a comparison result of said sensing signal and said dimming signal.

19. The system of claim 12, wherein said dimming controller comprises:
  a clock generator operable for generating a clock signal when said rectified voltage is greater than a first preset voltage and less than a second preset voltage; and
  a counter coupled to said clock generator and operable for counting pulses of said clock signal.

20. The system of claim 19, wherein said dimming controller further comprises:
  a comparator coupled to said counter and operable for generating a selection signal by comparing a counter value of said counter to a reference value,
  wherein said selection signal indicates whether said AC voltage comes from said TRIAC dimmer or said on/off switch dimmer.

* * * * *